UNITED STATES PATENT OFFICE.

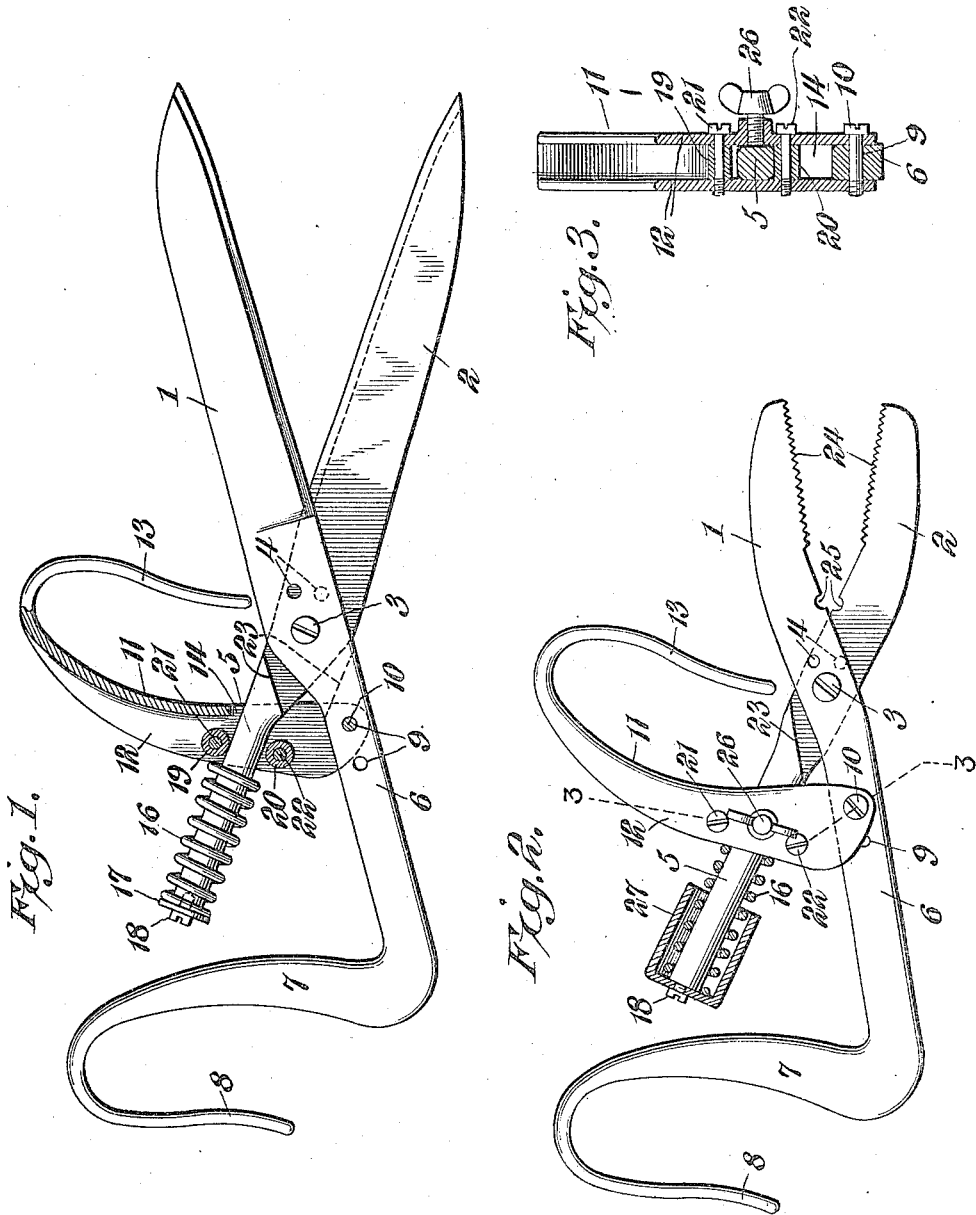

FREDERICK CHARLES SCOTT, OF DETROIT, MICHIGAN.

HANDLE FOR SHEARS, PLIERS, AND LIKE IMPLEMENTS.

1,227,678.  Specification of Letters Patent.  Patented May 29, 1917.

Application filed August 26, 1916. Serial No. 117,002.

*To all whom it may concern:*

Be it known that I, FREDERICK C. SCOTT, a subject of the King of Great Britain, residing at Detroit, in the county of Wayne and State of Michigan, have invented a new and useful Handle for Shears, Pliers, and like Implements, of which the following is a specification.

This invention relates to handles for shears, pliers, and other like implements.

An object is to provide shears, pliers, or other similar implements, such as forceps, punches, snips, etc., with improved means whereby the pressure of the hand of the operator is greatly increased in operating the device to cut, punch, or otherwise treat material.

A further object is to secure these desired results with a minimum number of parts, and to produce a simply constructed device combining the qualities of durability, strength and ease of operation.

A full and complete understanding of the invention may be obtained from a consideration of the following detailed description, taken in connection with the accompanying drawing forming a part of this specification; it being understood that while the drawing shows a practical form of the invention, the latter is not confined to strict conformity therewith, but may be changed or modified, as long as such changes or modifications mark no material departure from the salient features of the invention, as specifically pointed out in the claims hereto appended.

In the drawing, in which like reference characters designate like parts in each of the several figures:—

Figure 1 is a side elevation of a pair of shears having the improvements applied thereto, and shown partly in section.

Fig. 2 is a similar view, showing the improvements applied to a pair of pliers.

Fig. 3 is a sectional view, taken along the line 3—3 of Fig. 2.

In Fig. 1 of the drawing, shear blades 1 and 2 are pivoted in the ordinary manner by a screw 3 at their point of crossing. This pivot 3 is susceptible of change to a point nearer the ends of the cutting blades 1 and 2, by the provision of a plurality of holes 4 provided in the said blades for the reception of the screw 3, in order to increase or decrease the active effect of the cutting blades 1 and 2, or other active or working members as hereinafter described.

The blades 1 and 2 are provided beyond the pivotal member 3 with extended reduced shanks 5 and 6 respectively. The shank 6 is extended beyond the terminal of the shank 5, and is there provided with a substantially perpendicular bend or arm 7 extending toward the shank 5 and outside of the end thereof and is provided with a return bend 8, to provide a thumb engaging member or loop adapted, when the device is in use, to lie substantially around the base of the thumb in order to avoid accidental dropping of the shears, or other implement.

The shank 6 at an intermediate point between the pivotal member 3 and the bend or arm 7 is provided with a plurality of openings 9 through one of which is adapted to be passed a screw or other pivoting means 10, which is employed to fulcrum an actuating lever 11 to said shank.

The actuating lever 11 is curved slightly away from the arm 7 and is of channel formation, having the rearwardly extending side walls 12, for a purpose to be described and terminating at its free end in a return bend or loop 13, which is adapted to surround the fingers of the operator to coact with the aforesaid return bend 8 in maintaining the device securely in the grasp of the operator, while operating the same. The front wall of the actuating lever 11 is cut away as at 14 to provide a bifurcated lower end for the passage and free operation of the shank 5 as will be seen. The side walls 12 thus formed are adapted to lie on either side of the shank 6, and to be pivotally connected thereto through one of the openings 9 by the screw 10, and to permit of being readily rocked back and forth, toward and away from the arm 7 when the said members 7 and 11 are in the grasp of the operator.

The shank 5 is preferably rounded to receive a coiled expansion spring 16, which surrounds the same and bears at one end on the edges of the rearwardly extending side walls 12, and at the other end against a washer 17 which is held to the end of the reduced shank 5 by a screw 18 threaded into the end of the said shank 5.

The arm 7 formed at the end of the shank 6 is curved rearwardly or away from the actuating lever 11 in a manner to fit the palm of the hand of the operator.

Anti-friction rolls 19 and 20 rotating upon pintles 21 and 22 are mounted between the rearwardly extending walls 12 of the actuating lever 11 above and below the reduced shank 5, respectively, being spaced apart a sufficient distance to permit of the ready oscillation of the said shank 5 between the same. The blades 1 and 2 are provided with the usual offsets 23 in order to permit the cutting edges of the blades 1 and 2 to lie along the median line of the shanks 5 and 6.

The tendency of the compression spring 16 is to force the actuating lever 11 away from the arm 7, while the blades or other working members 1 and 2 are in normal or open position ready to be introduced to the material to be cut, or otherwise treated. When the device is grasped by the operator, and the actuating lever 11 is actuated in a direction toward the arm 7 by the fingers of the operator, the upper roll 19 rides along the upper inclined edge of the reduced shank 5 toward the free end thereof, and since the axis of the roll 19 moves along the arc of a circle struck from the pivotal member 10 and crosses the arc of movement of the shank 5, the same will exert a powerful pressure upon the shank 5 in a direction toward the shank 6, thus closing the blades or other working members 1 and 2, in the manner of a compound lever. By reason of this fact the construction is especially adapted for extra heavy work, and while the device has thus far been described as applied to shears, it will be readily seen that the same is equally adaptable to pliers, forceps, punches, snips, or any other device of this class, wherein great power is to be exerted on two opposed working blades or members.

In Fig. 2 for instance, the invention is shown applied to a pair of pliers and since the construction with slight exceptions, is precisely the same as that shown in Fig. 1, the same reference numerals are used to denote the same parts therein. The working members 1 and 2, however, in the present instance are provided with serrated surfaces 24, as is common practice, and wire cutting means 25 may also be provided in the same. The bifurcated actuating lever 11 is further provided at a point in alinement with the reduced shank 5 with a binding screw 26 passing through one of the rearwardly extending walls 12 of the said lever and adapted to bear against the side of said shank and to hold the jaws or working members 1 and 2 into tight engagement with the object being held therebetween. In addition to this a tubular spring casing 27 may be employed to surround the major portion of the spring 16 and is held to the shank 6 by the screw 18 in the same manner as the aforementioned washer 17.

From the foregoing, it will be seen that a very simple, powerful and durable means has been devised to actuate the jaws or other working members of a great diversity of hand tools of this class, and that by reason of the substantially parallel relation of the palm engaging arm or member 7 and the actuating lever 11 which, when the device is in use, are in upright position, extending above the goods being cut, or otherwise treated, a full view of the said material may be had by the operator and any danger of contact of the material with the hand of the operator is avoided.

What is claimed is:—

1. A device for the purpose described, comprising a pair of crossed working members, pivoted for rocking movement one upon the other, and each having a shank extended beyond the pivot, a thumb-engaging member or loop carried by the one shank and extending substantially at right angles thereto, the other shank terminating short of the thumb-engaging member and carrying a compression spring, an actuating lever bearing against the spring and having a finger engaging loop or bend, said lever being pivoted to the first-named shank and having means for engaging the second-named shank and bearing against said spring for causing an oscillation of the lever about its pivot, and the manipulation of the working members.

2. A device for the purpose described comprising a pair of longitudinally disposed active members arranged in crossed relation to each other and pivoted at the point of crossing, the said members being provided with shanks at one side of the pivot, one of the shanks being provided with a thumb-engaging loop or arm, the other shank terminating short of said loop or arm, an actuating lever adjustably pivoted to the first-named shank between the loop or arm and the pivot thereof and having a passageway for the short shank, and a compression spring mounted on the latter between the end thereof and the actuating lever.

3. A device for the purpose described comprising a pair of pivoted blades terminating on one side of the pivot in shanks, the shank of one member being provided with an upwardly extending loop or arm for engagement by the thumb and palm of the hand of the operator, the other shank terminating short of the said arm and provided with an abutment at its end, an actuating lever straddling the two shanks and pivoted to the first-named shank at a point between the pivot thereof and the said loop or arm, said lever terminating at its upper end in a finger engaging loop, anti-friction rolls mounted on the lever above and below the second named shank, and a spring mounted on said shank between said lever and the abutment.

In testimony, that I claim the foregoing as my own, I have hereto affixed my signature in the presence of two witnesses.

FREDERICK CHARLES SCOTT.

Copies of this patent may be obtained for five cents each, by addressing the "Commissioner of Patents, Washington, D. C."